United States Patent [19]

Yatka et al.

[11] Patent Number: 4,931,294

[45] Date of Patent: Jun. 5, 1990

[54] ENVIRONMENTALLY STABLE CHEWING GUM COMPOSITION CONTAINING XYLITOL

[75] Inventors: Robert J. Yatka, Orland Park; Mansukh M. Patel, Downers Grove; Michael A. Reed, Evanston, all of Ill.

[73] Assignee: Wm. Wrigley Jr. Company, Chicago, Ill.

[21] Appl. No.: 170,720

[22] Filed: Mar. 21, 1988

[51] Int. Cl.$^5$ .............................................. A23G 3/30
[52] U.S. Cl. ........................................ 426/3; 426/658; 426/804; 426/321
[58] Field of Search ................ 426/36, 548, 658, 804, 426/321

[56] References Cited

U.S. PATENT DOCUMENTS

| | | | |
|---|---|---|---|
| Re. 30,197 | 1/1980 | Klose | 426/3 |
| 3,296,079 | 1/1967 | Griffin | 167/93 |
| 3,655,866 | 4/1972 | Bilotti | 424/48 |
| 3,717,711 | 2/1973 | Miller | 424/343 |
| 3,899,593 | 8/1975 | Hammond | 426/3 |
| 3,914,434 | 10/1975 | Bohni | 424/343 |
| 3,915,736 | 10/1975 | Oyamada | 127/29 |
| 3,932,604 | 1/1976 | Barth | 424/49 |
| 3,970,747 | 7/1976 | Barth | 424/52 |
| 4,000,320 | 12/1976 | Klose | 426/3 |
| 4,065,578 | 12/1977 | Reggio | 426/3 |
| 4,097,616 | 6/1978 | Guillou | 426/548 |
| 4,105,801 | 8/1978 | Dogliotti | |
| 4,122,205 | 10/1978 | Burge | 426/548 |
| 4,127,677 | 11/1978 | Fronczkowski | 426/5 |
| 4,134,999 | 1/1979 | Muhler | 426/3 |
| 4,146,653 | 3/1979 | Mader | 427/3 |
| 4,153,732 | 5/1979 | Muhler | 426/72 |
| 4,157,401 | 6/1979 | Stroz | 426/3 |
| 4,161,544 | 7/1979 | Kaul | 426/5 |
| 4,208,431 | 6/1980 | Friello | 426/5 |
| 4,238,475 | 12/1980 | Witzel | 424/48 |
| 4,238,510 | 12/1980 | Cherukuri | 426/5 |
| 4,254,154 | 3/1981 | Eisenstadt | 426/548 |
| 4,271,197 | 6/1981 | Hopkins | 426/3 |
| 4,284,650 | 8/1981 | Goupil | 426/5 |
| 4,291,017 | 9/1981 | Beierle | 424/52 |
| 4,292,337 | 9/1981 | Andersen | 426/573 |
| 4,374,858 | 2/1983 | Glass | 426/5 |
| 4,514,422 | 4/1985 | Yang | 426/3 |
| 4,579,738 | 4/1986 | Cherukuri et al. | 426/3 |
| 4,581,234 | 4/1986 | Cherukuri et al. | 426/3 |
| 4,587,125 | 5/1986 | Cherukuri et al. | 426/3 |
| 4,590,075 | 5/1986 | Wei | 426/5 |
| 4,681,766 | 7/1987 | Huzinec | 426/5 |

FOREIGN PATENT DOCUMENTS

| | | |
|---|---|---|
| 2659424 | 7/1977 | European Pat. Off. . |
| 0009325 | 4/1980 | European Pat. Off. . |
| 0027024 | 4/1981 | European Pat. Off. . |
| 0229594 | 7/1987 | European Pat. Off. . |
| 2334311 | 7/1977 | France . |
| 4849962 | 7/1973 | Japan . |
| 56-25091 | 6/1981 | Japan . |
| 87-2848 | 11/1987 | South Africa . |
| 1401590 | 7/1975 | United Kingdom . |
| 1526020 | 9/1978 | United Kingdom . |
| 1532870 | 11/1978 | United Kingdom . |
| 1559989 | 1/1980 | United Kingdom . |

OTHER PUBLICATIONS

*Canadian Institute of Food Science and Technology Journal*, vol. 18, No. 1, (1985), Properties of Xylitol, first page and page containing "Table 1, Properties of some natural sugars and sugar alcohols".

J. N. Counsell, ed., Xylitol (Applied Science Publishers, Ltd., London, 1978), pp. 4–7.

R. G. Daoust et al., Mannitol in Chewable Tablets (Reprinted from Drug and Cosmetic Industry, Jul. 1963), page containing Tables I and II.

U. Manz et al., Xylitol-Its Properties and Use As A Sugar Substitute in Foods (Reprint of Food R. A. Symposium "Sugar and Sugar Replacements", paper, London, 1973), pages entitled Physical and Chemical Properties of Xylitol and Table III, Moisture Pickup of Xylitol.

G. P. Meade et al., Cane Sugar Handbook (tenth ed. 1977), pp. 387–389, 696–697.

A. A. Newman, Glycerol (C.R.C. Press, Cleveland, 1968), pp. 40–43.

*Primary Examiner*—Jeanette Hunter
*Attorney, Agent, or Firm*—Willian Brinks Olds Hofer Gilson & Lione

[57] ABSTRACT

Chewing gum containing gum base, xylitol and flavor, but which is free of added water and hygroscopic ingredients, is environmentally stable, i.e., does not absorb significant amounts of water from the atmosphere to soften with age, or give off significant amounts of water to the atmosphere to harden or stiffen with age.

10 Claims, 1 Drawing Sheet

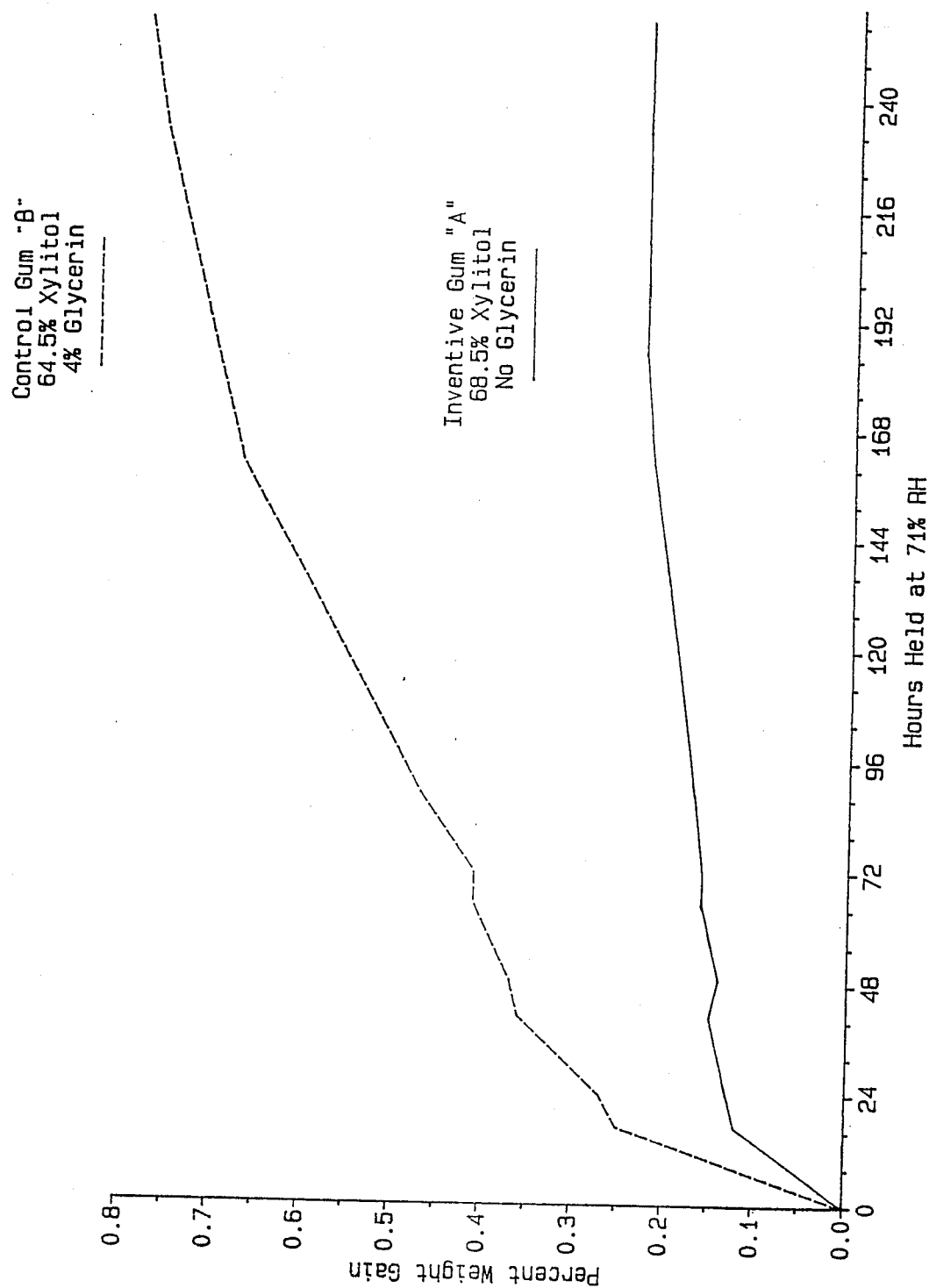

ENVIRONMENTALLY STABLE CHEWING GUM COMPOSITION CONTAINING XYLITOL

BACKGROUND OF THE INVENTION

This invention relates to chewing gum. More particularly, it relates to a chewing gum which contains gum base, xylitol and flavor, but is free of added moisture and hygroscopic ingredients; and which is environmentally stable, i.e., which does not absorb significant amounts of water from the atmosphere to soften with age or give off significant amounts of water to the atmosphere to harden or stiffen with age.

Hammond et al., in U.S. Pat. No. 3,899,593, issued Aug. 12, 1975. disclose a chewing gum composition containing a major amount of xylitol. The composition of U.S. Pat. No. 3,899,593 requires from about 2 to about 6% by weight of glycerol, a hygroscopic material, "in order to soften the gum base to the extent that the base will be capable of binding the crystalline material." (col. 1, lines 64–65 and col. 2, lines 19–21).

Reggio et al., in U.S. Pat. No. 4,065,578, issued Dec. 27, 1977, disclose a chewing gum composition wherein xylitol is used as a major bulking sweetening agent, and a hydrocolloid is used as a binder between the gum base and xylitol. The hydrocolloid also serves as a humectant to hold moisture in the gum (col. 1, lines 27–32). Both U.S. Pat. Nos. 3,899,593 and 4,065,578 teach that a binder is necessary to produce a gum product with xylitol as the major bulking agent.

Klose et al., in U.S. Pat. No. 4,000,320, issued Dec. 28, 1976, and reissued Jan. 22, 1980 as U.S. Pat. No. Re. 30,197, disclose a chewing gum composition containing less than 50% xylitol; and, as stated in the Examples and in the Reissue Patent at col. 1, line 68 - col. 2, line 2, preferably less than 10% by weight, especially from 1 to 3.2% by weight. Klose et al. use xylitol to extend the storage stability of the gum, by enabling the gum to retain more moisture when the gum is stored at low relative humidities (col. 2, lines 51–57; reissue at col. 2, lines 64–67).

Bohni, in U.S. Pat. No. 3,914,434, issued Oct. 21, 1975, discloses the use of xylitol as a non-cariogenic sugar substitute.

Fronczkowski et al., in U.S. Pat. No. 4,127,677, issued Nov. 28, 1978, disclose a xylitol-coated chewing gum, made by applying a coating syrup of 55–70 percent solids, of which solids 95–99.5 percent is xylitol.

Patel et al., in U.S. patent application Ser. No. 159,870 filed Feb. 24, 1988, disclose a chewing gum which employs xylitol as a rolling compound.

SUMMARY OF THE INVENTION

The gum compositions of the present invention contain gum base and xylitol as their major components, along with flavor as a minor component, and are made without any added liquids, moisture, hydrophilic binders or other hydrophilic ingredients. The resulting product is simpler to manufacture than gums containing more ingredients, and is very texture stable in extreme environmental conditions (up to 80% relative humidity) over an extended shelf life.

According to the present invention, there is provided a chewing gum composition which does not significantly gain or lose moisture when exposed to high or low humidity conditions, consisting essentially of (a) from about 5 to about 95 percent, preferably from about 10 to about 50 percent, and more preferably from about 20 to about 30 percent, by weight of the gum, of gum base;

(b) from about 4.9 to about 94.9 percent, preferably from about 47 to about 89.5 percent, and more preferably from about 67 to about 79.5 percent, by weight of the gum, of xylitol; and (c) from about 0.1 to about 10 percent, by weight of the gum, preferably from about 0.5 to about 3.0 percent, of flavor;

the gum composition containing less than 0.25% of water and ingredients which are more hygroscopic than xylitol (or which have an equilibrium moisture content of more than about 7%) at relative humidities less than 80%.

The phrase "consisting essentially of" is used with respect to this invention in its ordinary sense. i.e., as allowing the presence of unspecified ingredients which do not materially affect the basic and novel characteristics of the invention. In the case of this invention, however, it is to be noted that added water, glycerin, hydrophilic binders or other hydrophilic ingredients, outside of the claimed limits, materially affect the basic and novel characteristics of the invention; although inclusion of other optional ingredients such as dextrose, sucrose, colors (not dispersed in glycerin), emulsifiers, pharmaceutical agents, fillers, high intensity sweeteners such as encapsulated aspartame, flavor enhancers, softeners, food acids, lecithin, and mannitol, in general do not.

"High humidity conditions" as used herein refers to humidity up to about 80% relative humidity.

DESCRIPTION OF THE DRAWING

The drawing illustrates a comparison of the gum of the invention to a gum containing glycerin with respect to gaining water in high humidity conditions (71%).

DETAILED DISCLOSURE

The gum compositions of the present invention contain gum base and xylitol as their major components, along with flavor as a minor component.

In general, a chewing gum composition contains a chewable gum base portion which is essentially free of water and water-insoluble, a water-soluble bulk portion (or "bulking agent") and flavors which are typically water insoluble. The water-soluble portion dissipates with a portion of the flavor over a period of time during chewing. The gum base portion is retained in the mouth throughout the chew.

The chewing gum compositions of the present invention follow the general pattern outlined above. They are made with xylitol as the bulking agent, but without any added moisture. The most important aspect of the compositions of the present invention is the omission of any added water and ingredients which are more hygroscopic than xylitol at relative humidities less than 80%. This renders the product environmentally stable by virtue of the fact that it will resist softening and stiffening with age due to moisture gain or loss, respectively, or due to crystalline changes. It is believed that texture stability is increased by slowing crystalline changes.

The insoluble gum base generally comprises elastomers, resins fats and oils waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils and cocoa butter. Commonly employed waxes include paraffin microcrystalline and natural waxes such as beeswax and carnuba. The insoluble gum base constitutes from about 5 to about 95 percent, preferably from about 10 to about 50 percent, and more preferably from about 20 to about 30 percent, by weight of the gum.

The gum base typically also includes a filler component, such as calcium carbonate, talc, dicalcium phosphate and the like. The filler constitutes from about 5 to about 60 weight percent of the gum base, preferably from about 5 to about 50 weight percent.

Gum bases typically also contain softeners, including glycerol monostearate and glycerol triacetate. Further, gum bases may also contain optional ingredients such as antioxidants, colors, and emulsifiers. The present invention contemplates using any commercially acceptable gum base which requires no aqueous or hygroscopic softeners to provide a soft texture and whose film-forming characteristics will bind the composition together. The best texture is achieved with soft bases, i.e., bases with softening points of about 50°-65° C. Often, a bubble gum base constitutes a portion of the gum base, which improves the film forming characteristics and binding ability of the base.

As noted above, the gum base is essentially free of water, i.e., it contains no specifically added water, but only trace amounts of water which are inherent in the ingredients of the gum base. Typically the gum base will contain on the order of 0.1 or 0.2 percent water, which is very difficult to remove.

The second essential component of the gum composition of the invention, which constitutes the water-soluble bulk portion is xylitol. Xylitol is a pentahydric sugar alcohol having the formula

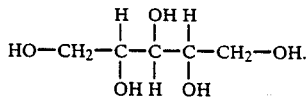

Xylitol is a crystalline compound. Its stable solid form melts at 93°-94.5° C.; the metastable form melts at 61°-61.5° C. The solubility in water of the stable form is 64.2 grams per 100 grams of solution at room temperature. Its relative sweetness is about 90% of that of sucrose. It is readily digested and is easily metabolized by diabetics. It is commonly used as an oral and intravenous nutrient, as a dietary additive, and in anticaries preparations.

Xylitol constitutes from about 4.9 to about 94.9 percent, preferably from about 47 to about 89.5 percent, and more preferably from about 67 to about 79.5 percent, by weight of the gum.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1 to about 10.0 percent, preferably from about 0.5 to about 3.0 percent, by weight of the gum.

Optional ingredients such as colors (not dispersed in glycerin), emulsifiers and pharmaceutical agents may also be added as separate components of the chewing gum composition, if not added as part of the gum base. Other ingredients which may optionally be added include dextrose and sucrose sugars, free and/or encapsulated aspartame as a sugarless sweetening agent, lecithin as an emulsifier and a softening agent, other softening agents, flavor enhancers, food acids and mannitol.

Mannitol, a hexahydric sugar alcohol, is preferably added as a supplemental bulking and sweetening agent. Although it is less sweet than xylitol, its hygroscopicity (below 80% humidity) is less than that of xylitol, and it has less solubility in water than xylitol. As a result of its lower solubility, it remains in the gum longer, lengthening the time that sweetness and flavor are observed.

Mannitol can be added directly to the mix, or used as a rolling compound, i.e., a non-hygroscopic material added in powdered form to the surface of sticks of gum to prevent the sticks of gum from sticking to machinery, wrapping papers, and the like.

Other conventional gum ingredients may also included. In selecting ingredients for the chewing gum compositions, however, it is to be remembered that the chewing gum compositions are made without any added water or ingredients which are more hygroscopic than xylitol, hydrophilic binders or other hydrophilic ingredients. Encapsulated aspartame is a high intensity sweetener with improved stability and release characteristics, as compared to free aspartame. Free aspartame can also be added, and a combination of some free and some encapsulated aspartame is preferred.

The use of aqueous syrups (such as corn syrup and hydrogenated corn syrup) should be avoided, because if such syrups are included in the gum, and if the gum is subjected to a drop in humidity present in the surrounding atmosphere, crystals of the carbohydrates present in the gum can undesirably crystallize and grow, resulting in a loss of flexibility of the gum. Likewise, aqueous sweeteners and other aqueous ingredients are to be avoided, as are glycerin, fructose and sorbitol.

As noted above, the gum composition of the invention should contain less than 0.25% of water and ingredients which are more hygroscopic than xylitol at relative humidities less than 80%. An alternative statement is that the gum composition of the invention should contain less than 0.25% of water and ingredients which have an equilibrium moisture content of more than about 7% at relative humidities less than 80%.

The hygroscopicity of materials is best expressed as their equilibrium moisture content, which varies with the relative humidity of the atmosphere surrounding the material under consideration. The equilibrium moisture content of xylitol increases gradually up to about 80% relative humidity; at 78% relative humidity and 20° C. it is 7%. Above 80% relative humidity, however, the equilibrium moisture content of xylitol increases dramatically. At 90% relative humidity, the equilibrium moisture content of xylitol is about 75%. By way of comparison at 80% relative humidity and 25° C., the equilibrium moisture content of glycerin is 49%. The equilibrium moisture contents of fructose, sorbitol, dextrose and sucrose at 78% relative humidity and 20° C. are 45%, 33%, 5% and 3%, respectively. At 77% relative humidity and 26.7° C., the equilibrium moisture contents of dextrose, sucrose and mannitol are 0.6%. 0.3% and 0.2%, respectively.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color may also be added at this time. The xylitol bulking agent may then be added in portions to the mixer. Flavor is typically added with the final portion of the xylitol bulking agent. Other optional ingredients are added in the batch in a typical fashion well known to those of ordinary skill in the art. It is conventional to cool the gum prior to wrapping, so as to make the gum more manageable.

The invention will now be illustrated with examples.

EXAMPLE 1

Gums were prepared from the following ingredients:

|  | A | B |
|---|---|---|
| Paloja gum base | 15.0% | 15.0% |
| Magna gum base | 15.0% | 15.0% |
| Xylitol | 68.5% | 64.5% |
| Glycerin | — | 4.0% |
| Peppermint flavor | 1.5% | 1.5% |
| Total | 100.0% | 100.0% |

The water content of gum composition "A" was measured and found to be 0.12%. It had a measured equilibrium relative humidity (ERH) of 32.7%; and furthermore was slower to gain or lose water in environments which contained lower, or higher, relative humidities respectively, than other gums having similar ERH.

The measurement of equilibrium relative humidity is a technique used to identify the tendency of a composition to lose or gain water at a given relative humidity. ERH is measured by storing sticks of the gum in various relative humidity conditions and measuring their loss or gain of weight after a sufficient time. The weight change is attributed to loss or gain of water. The ERH value of a gum composition is the relative humidity at which the gum will neither gain nor lose water. For example, an ERH of 50% means that a gum with such an ERH which is stored in a relative humidity of 50% remains stable, neither gaining nor losing moisture. It will presumably have a longer shelf life than a gum which has an ERH which is lower or higher than the ambient relative humidity of the environment. Typical sugar-containing gums will have an ERH on the order of 40 to 50%, while so-called "anhydrous" gums may have an ERH of 15 to 25%. Gum with a very low ERH will pick up water and soften and may as a result undergo undesirable changes such as recrystallization. Gum which has too high an ERH will harden and become tough and crumbly upon loss of water.

ERH is an indication of whether or not a gum will gain or lose water in a particular environment, but is not in itself an indication of how fast a gum will gain or lose water (i.e., the rate at which the water content of the gum will change). In general, the more glycerin or other hygroscopic ingredients there are in a gum, the lower will be its ERH, and the more quickly the gum will absorb water at relative humidities above the ERH for the gum. On the other hand, the more water there is in a gum, the higher will be its ERH, and the more quickly the gum will lose water at relative humidities below the ERH for the gum. The effects of hygroscopic ingredients and water content on ERH may be balanced by increasing both hygroscopic ingredients and water, but their effects on rate of change of water content are not. Increasing both hygroscopic ingredients and water content in gums in the proper proportions may not change the ERH of the gum, but it will increase the tendencies of the gum both to gain and to lose water at relative humidities above and below the ERH for the gum, respectively.

Bare gum sticks of the above compositions "A" and "B" were placed in a 71% relative humidity environment, and their ability to absorb water was determined by weighing sticks of each gum composition after various amounts of time had elapsed. The results were as follows:

|  | Cumulative percent weight gain: | |
|---|---|---|
| Elapsed Time (Hours) | Composition "A" (Invention) | Composition "B" (Control) |
| 0 | 0.00 | 0.00 |
| 17 | 0.12 | 0.25 |
| 24 | 0.13 | 0.27 |
| 41 | 0.15 | 0.36 |
| 49 | 0.14 | 0.37 |
| 65 | 0.16 | 0.41 |
| 72 | 0.16 | 0.41 |
| 89 | 0.17 | 0.47 |
| 161 | 0.22 | 0.67 |
| 185 | 0.23 | 0.70 |
| 209 | 0.23 | 0.73 |
| 233 | 0.23 | 0.76 |
| 257 | 0.23 | 0.78 |

The results show that even in 71% relative humidity, the inventive gum absorbs water significantly more slowly than similar gum containing 4% glycerin. These results are illustrated graphically in the drawing.

EXAMPLE 2

Three batches of gum were made according to the following formulas:

|  | C | D | E |
|---|---|---|---|
| Paloja chewing gum base | 30.0% | 30.0% | 30.0% |
| Xylitol | 68.7% | 64.7% | 64.7% |
| Peppermint flavor | 1.3% | 1.3% | 1.3% |
| Glycerin | — | 4.0% | 2.0% |
| Water | — | — | 2.0% |
| Total | 100.0% | 100.0% | 100.0% |

All three compositions "C", "D", and "E" were formed into sticks, using a standard production sheeting machine. Compositions "D" and "E" appeared to be wet, were too soft to measure taber stiffness (force necessary to deflect the stick 15°) or to be wrapped, and were of unacceptably soft texture. They could, however, be tested in the manner described below.

Sticks of all three compositions were tested to determine change in flexibility during storage. The gum was stored unwrapped in an environment of approximately 34% relative humidity for 21 days, and flex tested at 2, 4, 7, 11, 14, 18 and 21 days. The flex testing machine mechanically flexes sticks of gum through an arc of 45° until it breaks. From 3 to 5 sticks of each composition were tested at each of the seven testing times, and the average numbers of flexes necessary to break the sticks were recorded.

In recording the number of flexes, a movement back and forth was counted as one flex. In accordance with customary testing procedure for this test, a stick breaking anywhere in the first or second half of a given flex cycle was counted as breaking on that cycle; e.g., a stick breaking anywhere in the fifth back-and-forth flexing of the stick was counted as "5".

The results were as follows:

| Day | C | D | E |
| --- | --- | --- | --- |
| 2 | 17**** | 4***** | 4.2***** |
| 4 | 17.67*** | 4**** | 4.25**** |
| 7 | 17.0**** | 4**** | 5.0**** |
| 11 | 18.0*** | 5.0*** | 5.0*** |
| 14 | 17.67*** | 5.0*** | 6.0*** |
| 18 | 16.75**** | 4.67*** | 5.67*** |
| 21 | 16.67*** | 5.0*** | 6.0*** |

***average of 3 sticks
****average of 4 sticks
*****average of 5 sticks

The composition according to the invention, composition "C", became 1.9% less flexible in 21 days indicating that it was stable. Composition "D" became 25% more flexible, and composition "E" became 42.9% more flexible, indicating both were absorbing water rapidly in this environment.

Paloja and magna chewing gum bases used in the Examples are commercially available from the L. A. Dreyfus Company in Plainfield, N.J. The "glycerin" used in the Examples was actually 99% glycerin and 1% water, which naturally is present in glycerin exposed to the atmosphere, owing to its hygroscopic nature of glycerin. Glycerin containing up to 4% water is frequently used in chewing gums, and even when containing 4% water, it is high hygroscopic.

What is claimed is:

1. A chewing gum composition which does not significantly gain or lose moisture when exposed to high or low humidity conditions, consisting essentially of
    (a) from about 5 to about 95 percent, by weight of the gum, of gum base;
    (b) from about 4.9 to about 94.9 percent, by weight of the gum, of xylitol; and
    (c) from about 0.1 to about 10 percent, by weight of the gum, of flavor;
    the gum composition containing less than 0.25% of water and ingredients which are more hygroscopic than xylitol at relative humidities less than 80%.

2. A chewing gum composition according to claim 1, comprising from about 10 to about 50 percent by weight of the gum, of gum base.

3. A chewing gum composition according to claim 1, comprising from about 20 to about 30 percent, by weight of the gum, of gum base.

4. A chewing gum composition according to claim 2, comprising from from about 47 to about 89.5 percent, by weight of the gum, of xylitol.

5. A chewing gum composition according to claim 3, comprising from from about 67 to about 79.5 percent, by weight of the gum, of xylitol.

6. A chewing gum composition according to claim 5, comprising from from about 0.5 to about 3.0 percent, by weight of the gum, of flavor.

7. A chewing gum composition according to claim 1, comprising in addition at least one member selected from the group consisting of dextrose, sucrose, colors, emulsifiers, pharmaceutical agents, fillers, high intensity sweeteners, flavor enhancers, softeners, food acids and mannitol.

8. A chewing gum composition according to claim 7, comprising aspartame as a high intensity sweetener.

9. A chewing gum composition according to claim 7, comprising lecithin as an emulsifier and a softening agent.

10. A chewing gum composition which does not significantly gain or lose moisture when exposed to high or low humidity conditions, consisting essentially of
    (a) from about 5 to about 95 percent, by weight of the gum, of gum base;
    (b) from about 4.9 to about 94.9 percent, by weight of the gum, of xylitol; and
    (c) from about 0.1 to about 10 percent, by weight of the gum, of flavor;
    the gum composition containing less than 0.25% of water and ingredients which have an equilibrium moisture content of more than about 7% at relative humidities less than 80%.

* * * * *

UNITED STATES PATENT AND TRADEMARK OFFICE
CERTIFICATE OF CORRECTION

PATENT NO. : 4,931,294

DATED : June 5, 1990

INVENTOR(S) : Robert J. Yatka et al.

It is certified that error appears in the above-identified patent and that said Letters Patent is hereby corrected as shown below:

In column 2, line 64, after "resins" please insert --,--.

In column 5, line 43, after "humidities, please insert --,--.

In claim 4, line 2, please delete the second occurrence of "from".

In claim 5, line 2, please delete the second occurrence of "from".

In claim 6, line 2, please delete the second occurrence of "from".

Signed and Sealed this

Twenty-second Day of September, 1992

Attest:

DOUGLAS B. COMER

*Attesting Officer*      *Acting Commissioner of Patents and Trademarks*